United States Patent

[11] 3,567,006

| [72] | Inventors | Charles C. Bell |
| | | Warwick; |
| | | Frank C. Di Mauro, Providence, R.I. |
| [21] | Appl. No. | 789,283 |
| [22] | Filed | Jan. 6, 1969 |
| [45] | Patented | Mar. 2, 1971 |
| [73] | Assignee | Leesona Corporation |
| | | Warwick, R.I. |

[54] BOBBIN ORIENTING AND FEEDING
11 Claims, 5 Drawing Figs.

[52] U.S. Cl. ..................................................... 198/33, 221/165
[51] Int. Cl. ............................................ B65g 47/24
[50] Field of Search .......................................... 221/165, 236, 238; 198/33 (IR)

[56] References Cited
UNITED STATES PATENTS

| 2,891,668 | 6/1959 | Hunt ............................. | 198/33.(I) |
| 3,054,170 | 9/1962 | Benichasa ..................... | 198/33.AA |

FOREIGN PATENTS

| 701,848 | 1/1954 | Great Britain ................. | 221/165 |

*Primary Examiner*—Richard E. Aegerter
*Attorneys*—Albert P. Davis and Burnett W. Norton ABSTRACT: Bobbin handling apparatus in which bobbins are stored in random orientation in a hopper and are delivered by the apparatus in an oriented manner. The bobbins in the hopper are agitated by a member movable vertically through the hopper. This member has an upwardly open mouth and upon upward movement of the member the mouth receives small ends of a portion of the bobbins in the hopper with large ends of the bobbins resting on the member adjacent the mouth. A pusher is provided for moving the bobbins to one end of the mouth from which they are received between a pair of downwardly inclined rods rotated in opposite directions so as to lift the bobbins and permit them to move down the rods to an escapement. When a bobbin is required, the escapement opens to permit a bobbin to be discharged through a chute to a conveyor belt with the bobbins oriented on the belt with smaller ends leading.

INVENTORS
CHARLES C. BELL
FRANK C. DI MAURO.
BY
ATTORNEYS

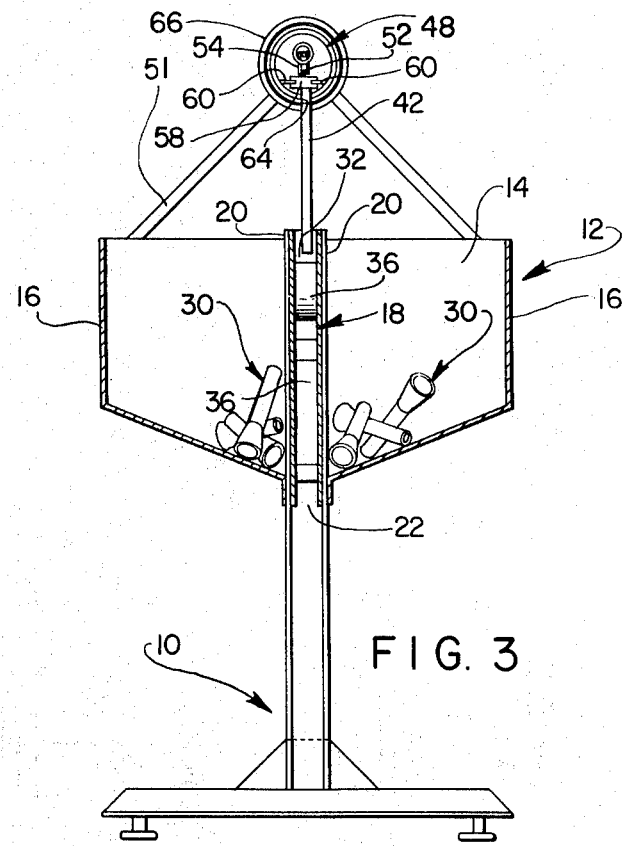
FIG. 3
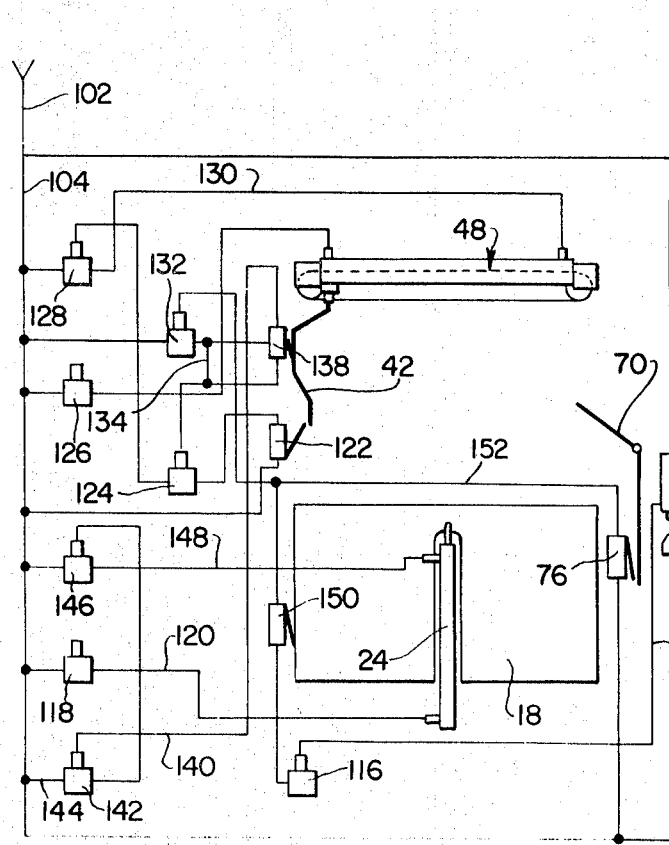
FIG. 4
FIG. 5
INVENTORS
CHARLES C. BELL
FRANK C. DiMAURO
ATTORNEYS

BOBBIN ORIENTING AND FEEDING

This invention relates to textile machinery and, more particularly, to apparatus for storing and orienting bobbins.

Automatic handling of bobbins, and particularly automatic feeding of bobbins to winding stations requires that the bobbins be properly oriented before they are presented to the winding station. Generally, such equipment includes a storage hopper from which bobbins are fed, either one at a time or in a group, to some sort of orienting equipment from which the bobbins pass to a conveyor which deposits them at the winding stations. Separate storage hoppers and orienting devices interconnected by some conveying means entail considerable expense and utilize a substantial amount of floor space. Furthermore, each separate handling of the bobbins provides an additional chance for bobbins to be scuffed or otherwise damaged.

It is a primary object of this invention to provide new and improved bobbin handling apparatus.

Another object is to provide new and improved bobbin storage and orienting apparatus. A related object is the provision of such apparatus in which a storage hopper and orienting mechanism are combined as a single unit. Another related object is the provision for delivering the bobbins one at a time.

A more specific object is the provision of new and improved bobbin storage and orienting apparatus in which a storage hopper is provided with a member movable vertically therethrough for agitating the bobbins, the member having an upwardly opening mouth for receiving the small end of the bobbins with the larger end resting on the member adjacent the mouth, and a pusher for moving the bobbins to a discharge end of the mouth from which they are received by downwardly inclined rods rotated so as to move the bobbins to an escapement mechanism at the lower ends of the rods. A related object is the provision for mounting and actuating the member to provide free motion of the member. Another related object is the provision for effectively preventing jamming of the bobbins.

These and other objects and advantages of the invention will be apparent from the following description and the accompanying drawings, in which.

Figure 1:
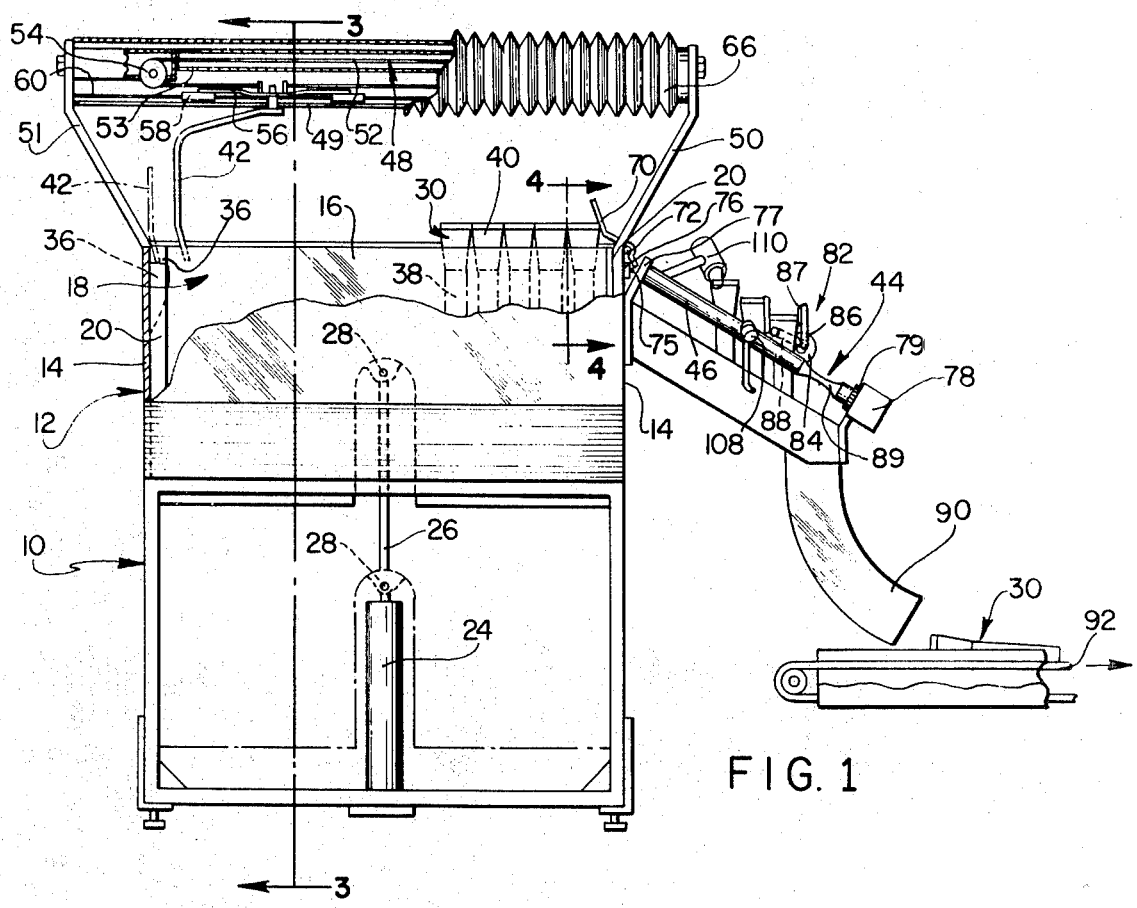
FIG. 1 is an elevational view of a preferred embodiment of the bobbin storage, orienting and delivering apparatus, with parts broken away and removed for clearer illustration.
Figure 2:
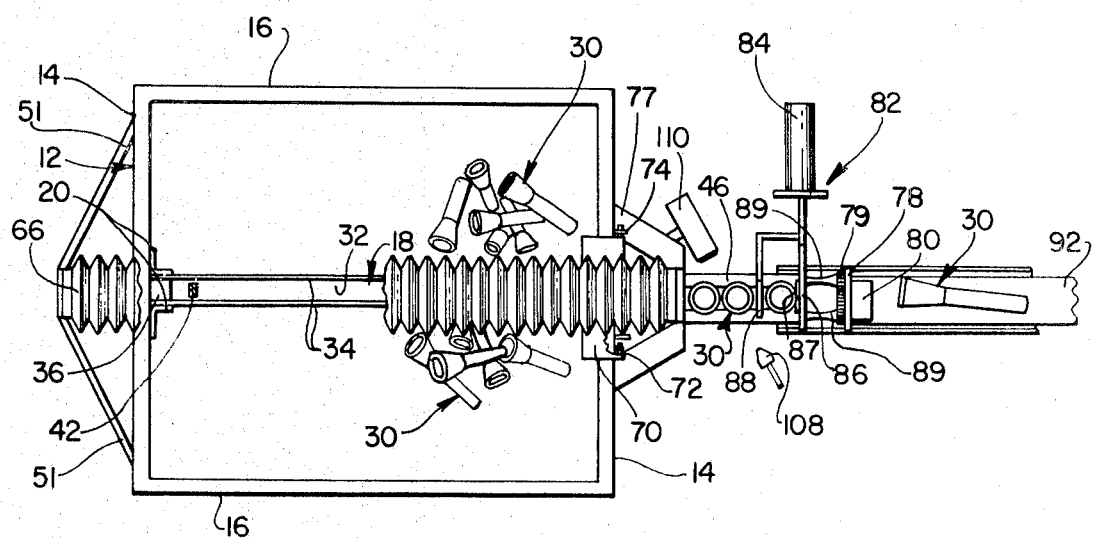
FIG. 2 is a top view of the apparatus shown in FIG. 1, with parts broken away and removed for clearer illustration.

FIGS. 3 and 4 are sectional views taken generally along the line 3—3 and 4—4, respectively, in FIG. 1; and FIG. 5 is a diagram of a simplified control circuit suitable for operating the apparatus.

Referring generally to FIGS. 1—4 of the drawings, a frame 10 supports an open top bobbin receiving hopper 12 having opposite end walls 14 interconnecting opposite sidewalls 16 with the opposite walls converging (FIG. 3) toward a lower center portion of the hopper. An elongated agitating and orienting member 18 is mounted at its opposite ends in guides 20 spaced apart and fixedly secured on either of the end walls 14 for vertical movement of the member through a slot 22 extending along the lower central portion of the hopper 12. A double-acting operating cylinder 24 has its lower end secured to a cross member of the frame 10 with the piston rod 26 of the cylinder connected at its upper end by means of a universal connection such as a ball and socket connection 28 to the midpoint of the member which is notched in this area so that it may receive the cylinder in the lowermost position of the member. The universal connection effectively prevents binding of the member as it moves up and down in its guides 20. Thus as the agitating and orienting member 18 moves up and down in the hopper 12, bobbins 30 therein are agitated to assure a portion of the bobbins falling into an upwardly open mouth 32 of the member 18. To provide this mouth 32, member 18 is formed by a pair of spaced apart panels 34 secured to each other at their ends by spacers 36 located (FIGS. 2 and 3) between the panels. The spacing between the panels 34 is sufficient to permit the shanks or small ends 38 of the bobbins 30 to be received therein with the larger frustoconical heads 40 of the bobbins resting on upper edges of the panels along the mouth 32.

When the member 18 is in its upper position (as shown by solid lines in FIG. 1), a pusher 42 is operated for sliding the bobbins 30 in the mouth 32 and along the upper edges of panels 34 from the left end of the member 18 to he right end of the member and onto discharge means 44 including a pair of spaced apart rods 46, as will be described hereinafter. The pusher 42 is operated by means of a pneumatic cylinder 48. A rigid tube 49 is provided to generally surround and support the cylinder 48. A pair of V-shaped brackets 50, 51 are provided to support the front and rear ends, respectively, of tube 49 in a position somewhat above and in alignment with mouth 32, as best seen in FIGS. 1 and 3. The lower ends of brackets 50, 51 are connected as by a weld to the respective front and rear end walls 14 of hopper 12. The cylinder 48 is provided with a cable 52 connected to opposite faces of the piston 53 of cylinder 48, with opposite runs of the cable extending through sealed apertures in opposite end walls of the cylinder and passing around idler pulleys 54, one such idler pulley being seen in FIG. 1. Each end of cable 52 is then connected to an elongated traveler carrier 56 having guide plates 58 (FIGS. 1 and 3) positioned at each of its ends, these plates being grooved to receive tracks 60 extending the length of tube 49, said tracks being disposed adjacent the opposite sides of an elongated slot 64 running the full length of tube 49 in the lower region thereof, as best seen in FIG. 3. Tube 49 is encased by a bellows 66 for excluding foreign matter from within the tube. Attached to the carrier 56 and extending through the elongated slot 64 and the bellows 66, and in sealing engagement with the bellows, is the pusher 42 which is tapered at its lower end to be received in the mouth 32 of the agitating and orienting member 18. In its waiting position farthest to the left as shown by phantom lines in FIG. 1, the pusher 42 is seated within the left hand vertical guides 20 and the left hand spacer 36 is spaced downwardly from the top of the panels 34 so that as the bobbins 30 are lifted by the member 18 they do not engage the pusher 42.

The control system, to be described hereinafter, is such that the pusher 42 moves from its waiting, left hand position to the right (viewing FIG. 1) only when he agitating and orienting member 18 is in its upper position. Upon such movement the bobbins 30 are moved to the right and pass through a vertical slot 68 (FIG. 4) in the right hand end wall 14 of the hopper 12 and onto the rods 46. Upon engagement of a plate 70 by the pusher 42, or should a bobbin 30 be carried crosswise atop the member 18 or excess bobbins be in the mouth 32 so that they popup and engage the plate, the plate 70 is pivoted on a pin 72 journaled in a bracket 74 secured to the right end wall 14 of the hopper. The plate 70 is urged counterclockwise into abutting engagement with the end wall 14 by a suitable spring (not shown). Clockwise pivoting of this plate 70 actuates a plunger 75 of a valve 76 located on then endwall 14. Actuation of plunger 75 causes the pusher 42 to be returned to the left end of its stroke, as will be more fully described hereinafter.

The opposing ends of rods 46 are journaled in bearings carried in bearing supports 77 and 78, respectively, as shown in FIG. 1. Each rod 46 carries at its lower end, or right hand end as seen in FIG. 1, a gear 79, the gear of one rod being meshed with the gear of the other rod and one of the gears being suitably driven by a motor 80. Thus, the rods 46 are rotated in opposite directions with opposed faces of the rods rotating upwardly so that bobbins 30 on the rods tend to be lifted and thus move to the lower end of the rods. An escapement mechanism 82 is provided near the lower ends of the rods 46, and as illustrated herein, (FIGS. 1 and 2) comprises a double-acting pneumatic cylinder 84 suitably mounted on the frame 10 with its piston rod serving as a delivery abutment 86 normally extending across the space between the rods 46 to retain the bobbins 30 thereon. A second abutment 88 secured to the abutment 86 is spaced from the space between the rods 46 and back from the piston rod or delivery abutment 86 which has a protuberance 87 formed thereon. When a bobbin is required the cylinder 84 is actuated to retract its piston whereupon the second abutment 88 moves between the two lower bobbins 30 to retain all but the lowermost bobbin on the rods 46 and the delivery abutment or piston rod 86 is withdrawn from across the rods 46 whereupon the lowermost bobbin 30 slides downwardly into a pair of opposed notched portions 89 in the rods 46 (see FIG. 2), these notches 89 being spaced sufficiently far apart so that the bobbin head 40 may drop therethrough. As a bobbin 30 drops through the notches 89 it falls into a curved chute 90 which deposits small end 38 of each bobbin forward on a conveyor belt 92 suitably driven in the direction of the arrow in FIG. 1. Then the cylinder returns to its normal position and the bobbins on the rods slide downwardly with the lowermost bobbin against the piston rod or delivery abutment 86.

A simplified form of a control circuit suitable for operating the apparatus is illustrated in FIG. 5. The escapement mechanism 82 is operated by a suitable external signal which opens a valve 100 to the double-acting escapement cylinder 84 to release the bobbin 30 at the lower end of the rods 46 with the second abutment 88 retaining the other bobbins on the rods until the valve 100 is closed whereupon these bobbins slide downwardly with the lowermost bobbin retained on the rods by the delivery abutment 86 preparatory to its delivery into chute 90 when a new signal is transmitted to valve 100.

The control system of the present invention includes a main air supply line 102 connected with branch supply lines 104 and 106, one to a bobbin level sensor nozzle 108 and the other to an associated normally closed sensor valve 110, respectively. When the supply of bobbins 30 on the rods 46 is depleted a predetermined amount, a jet of air from the nozzle 108 engages an actuator 112 on the valve 110 opening the valve. The jet is normally blocked from engaging the actuator 112 by bobbins on the rods 46. When the valve 110 opens supply air passes through a conduit 114 to a normally closed master control valve 116 of the system, the function of which will be described later.

Upon initial operation, supply air is also provided through the branch supply line 104 to a normally open valve 118 and a conduit 120 to the lower end of the cylinder 24, causing the member 18 to move to its upper position as seen in FIG. 1, regardless of whether or not the bobbin level nozzle 108 and valve 110 sense bobbins 30 on the rods 46. As the member 18 moves into its uppermost position it opens a normally closed valve 122 permitting air to flow therethrough from the branch supply line 104 and then through a normally open valve 124 to provide pilot air for closing a normally open valve 126 and opening a normally closed valve 128 which passes supply air from the branch supply line 104 through a conduit 130 to the right end of the cylinder 48, causing the actuating cable 52 of cylinder 48 to move the pusher 42 from its waiting position at the left end of the hopper 12 toward the right end thus sliding the bobbins 30 in the mouth 32 of the member 18 onto the rotating rods 46.

In the event that the rods 46 are full of bobbins, the pusher 42 continues to exert pressure against the bobbins still on the member 18 so that a portion of these bobbins are pushed upwardly from the rods 46 and engage the pivoted plate 70 at the right end of the hopper, rocking this plate clockwise (as seen in FIG. 1) to engage plunger 75 and thereby open the normally closed valve 76. Similarly, in the event that a bobbin 30 is crosswise atop the member 18, engagement of this crosswise bobbin with the pivoted plate 70 will also cause the plate to swing clockwise for opening the valve 76 as will engagement of the pusher 42 with the plate 70. Opening of this normally closed valve 76 permits pilot air to flow therethrough from the supply line 104 to open a normally closed valve 132 which now passes pilot air from the branch supply line 104 through a conduit 134 to close the normally open valve 124 and shut off the pilot air to the previously noted normally open valve 126 thereby opening this valve which now permits supply air to pass through a conduit 136 to the left end of the cylinder 48.

Closing the normally open valve 124 also shuts off pilot air to the normally closed valve 128 which now closes and vents the right end of the cylinder 48 so that the pusher 42 returns to its extreme left end position when viewed in FIG. 1.

Return of the pusher 42 to its left end position opens a normally closed valve 138 so that supply air flows from the branch supply line 104 through the still open normally closed valve 132 and through the open pusher actuated valve 138 to provide pilot air through a conduit 140 for opening a normally closed valve 142 which upon opening provides pilot air from the branch supply line 104 through a conduit 144 to close the normally open valve 118 shutting off the supply of air to the lower end of the member cylinder 24 and opening a normally closed valve 146 to supply air from the supply line 104 through a conduit 148 to the upper end of the member cylinder 24 causing the member 18 to retract.

When the member 18 moves to its lowermost position it opens a normally closed valve 150 and pilot air captured in a conduit 152 between the normally closed valve 132 and the normally closed valve 76 at the right end of the hopper 12 is allowed to pass to the normally closed master control valve 116.

When the supply of bobbins 30 on the rods 46 is low, the jet of air from the bobbin level sensor nozzle 108 engages and operates the actuator 112 on the bobbin level sensor valve 110 to open this normally closed valve permitting supply air from the branch supply line 106 to pass through the valve 110 and open the normally closed master control valve 116, thus venting the pilot air in the conduit 152 and permitting closing of the normally closed valve 132 so that the supply of air through the presently open normally closed valve 76 is closed shutting off pilot air to the normally closed valve 142 whereupon this valve closes and vents the pilot air conduit 144 to the normally open valve 118 and a normally closed valve 146 which vents the upper end of the member cylinder and provides supply air through the branch supply line and the conduit 120 to the bottom of the member cylinder 24, thus repeating the previously described cycle.

While this invention has been described with reference to a particular embodiment in a particular environment, various changes may be apparent to one skilled in the art and the invention is therefore not to be limited to such embodiment or environment except as set forth in the appended claims.

We claim:

1. Bobbin handling mechanism comprising a hopper for holding bobbins in random orientation, bobbin orienting means mounted for movement within said hopper for gathering bobbins from said hopper and orienting said gathered bobbins, means for discharging said bobbins from said orienting means, means for receiving the bobbins so discharged from the orienting means and operable for releasing the oriented bobbins, said bobbin orienting means including a slidable member, means mounting said slidable member for movement within said hopper between upper and lower positions, means operable for moving said member between said positions, the slidable member having opposite ends, the mounting means including guide means on the hopper for receiving the respective ends of the slidable member, the moving means including an actuator movable in a generally parallel direction with respect to said guides, and means connecting said actuator with said slidable member.

2. Mechanism as set forth in claim 1, in which said moving means is a cylinder, said actuator is the piston rod of said cylinder, and the connecting means is a ball and socket connection between the piston rod and the slidable member.

3. Mechanism as set forth in claim 2, in which the discharging means is operable for moving the bobbins in an upwardly opening mouth provided in the slidable member, said mouth being provided to receive the bobbins from said hopper, the discharging means being operable to receive the bobbins in said mouth only when said slidable member is generally in its upper position, and said discharging means comprising pusher means mounted for movement through said mouth to engage and move the bobbins therefrom.

4. Mechanism as set forth in claim 3, in which the pusher means comprises a double-acting cylinder fixedly mounted above said mouth, said cylinder having a piston, a pusher assembly including a carrier and a pusher mounted on said carrier and extending into said mouth when said slidable member is in its upper position, a track mounting said carrier for movement to and fro along said mouth, cable means having opposite ends connected to said piston and connected with said carrier for moving the carrier to and fro along said mouth responsive to actuation of said cylinder.

5. Mechanism as set forth in claim 4, in which said discharging means comprises means for returning said pusher means to a waiting position after movement of the pusher through said mouth to move the bobbins toward said receiving means.

6. Mechanism as set forth in claim 5, in which the return means is operable for returning said pusher means to said waiting position is responsive to bobbins in excess of a predetermined member to said receiving means.

7. Mechanism as set forth in claim 6, in which said return means comprises an actuator pivoted to said hopper and engageable by said pusher means.

8. Mechanism as set forth in claim 1, in which the bobbins each have larger and smaller ends, the receiving means including a pair of spaced apart generally parallel supports for receiving the oriented bobbins from said slidable member with their smaller ends in the space between said supports and their larger ends resting on said supports, said supports being inclined downwardly from a receiving end adjacent said hopper to a releasing end and spaced from said hopper, means including rod means mounting said supports for rotation in opposite directions to thereby urge said bobbins downwardly along said supports, in which the releasing ends of said rods are formed with an opening for the passage of the larger end of a bobbin therethrough, and in which said receiving means includes escapement means for releasing the bobbins to pass through the opening in said rods.

9. Mechanism as set forth in claim 8, in which said escapement means comprises a pair of abutments, one normally in position to engage the lowermost bobbin on said rods and the other normally positioned spaced from said bobbins for movement into a bobbin holding position between the two lowermost bobbins on said rods, and means for moving said other rod into said holding position and said one rod away from said lowermost bobbin to permit the last said bobbin to pass through said opening.

10. Mechanism as set forth in claim 8, in which said hopper has opposed sides converging downwardly for movement of the randomly oriented bobbins therein toward a lower portion of the hopper, and said bobbin orienting means includes a slidable member, said slidable member having an upwardly opening mouth for receiving the bobbins from said hopper with their smaller ends within the mouth and their larger ends resting on the member along said mouth, means mounting said slidable member for movement within said hopper between upper and lower positions with said slidable member extending between said sides generally along said lower portion, and means operable for moving said member between said positions.

11. Mechanism as set forth in claim 10, in which the discharging means includes an abutment movable through said mouth when said member is generally in its upper position means mounting said abutment for movement along said mouth, and means operable for moving said abutment.